United States Patent
Ignatowicz et al.

(10) Patent No.: US 11,609,772 B2
(45) Date of Patent: Mar. 21, 2023

(54) DYNAMICALLY GENERATING GUIDED TOURS FOR SOFTWARE

(71) Applicant: RED HAT, INC., Raleigh, NC (US)

(72) Inventors: Eder Ignatowicz, Cambridge, MA (US); Guilherme Gomes, Campinas (BR)

(73) Assignee: Red Hat, Inc., Raleigh, NC (US)

( * ) Notice: Subject to any disclaimer, the term of this patent is extended or adjusted under 35 U.S.C. 154(b) by 126 days.

(21) Appl. No.: 17/024,963

(22) Filed: Sep. 18, 2020

(65) Prior Publication Data

US 2022/0091863 A1    Mar. 24, 2022

(51) Int. Cl.
   *G06F 9/50*      (2006.01)
   *G06F 9/451*     (2018.01)
   *G09B 19/00*     (2006.01)

(52) U.S. Cl.
   CPC .......... *G06F 9/453* (2018.02); *G06F 9/5027* (2013.01); *G09B 19/003* (2013.01)

(58) Field of Classification Search
   CPC ........ G06F 16/285; G06F 9/5027; G06F 8/38; G06F 30/30; G06F 3/0484; G06F 9/453; G06F 40/186; G06F 8/10; G06F 11/3688; G06F 11/36; G06F 40/169; G06F 17/40; G06Q 50/205; Y10S 715/97; H04L 41/22; G09B 19/003
   See application file for complete search history.

(56) References Cited

U.S. PATENT DOCUMENTS

| | | | | |
|---|---|---|---|---|
| 6,574,791 B1 * | 6/2003 | Gauthier | .................. | G06F 8/38 |
| | | | | 717/109 |
| 6,976,239 B1 * | 12/2005 | Allen | ...................... | G06F 30/30 |
| | | | | 716/117 |
| 7,159,184 B2 * | 1/2007 | Ullah | .................... | G06F 9/5027 |
| | | | | 717/121 |

(Continued)

FOREIGN PATENT DOCUMENTS

| | | | | |
|---|---|---|---|---|
| AU | 2010308132 A1 * | 5/2012 | ............. | G06F 11/36 |
| AU | 2014100876 A4 * | 9/2014 | ........... | G06F 16/248 |

(Continued)

OTHER PUBLICATIONS

Brand, C., et al., "Graphiti-Development of High-Quality Graphical Model Editors," SAP AG, https://www.eclipse.org/graphiti/documentation/files/EclipseMagazineGraphiti.pdf.

*Primary Examiner* — Steven P Sax
(74) *Attorney, Agent, or Firm* — Kilpatrick Townsend & Stockton LLP (57) ABSTRACT

Guided tours for software can be dynamically generated. In one example, a system can select a first sub-tutorial based on a process to be performed by a user within a graphical user interface of a software component. The first sub-tutorial can include a first step for performing a first part of the process and a reference to a second sub-tutorial. The system can select the second sub-tutorial based on the reference in the first sub-tutorial. The second sub-tutorial can include a second step for performing a second part of the process. The system can generate a tutorial based on the first step and the second step. The system then guides the user through performing the process by detecting an event associated with each step in the tutorial and responsively generating an indicator of a next step in the tutorial.

20 Claims, 5 Drawing Sheets

(56) References Cited

U.S. PATENT DOCUMENTS

| | | | |
|---|---|---|---|
| 7,415,714 B2 | 8/2008 | Chapman | |
| 8,065,128 B1 * | 11/2011 | Chase | G06F 30/30 |
| | | | 703/14 |
| 8,291,318 B2 | 10/2012 | Budreau et al. | |
| 8,713,436 B2 | 4/2014 | Cheng et al. | |
| 9,009,585 B1 * | 4/2015 | Chetrit | G06F 9/453 |
| | | | 715/221 |
| 9,157,735 B2 * | 10/2015 | Haisty | G01B 5/12 |
| 9,183,752 B2 | 11/2015 | Nickell et al. | |
| 9,361,086 B1 | 6/2016 | Garratt et al. | |
| 10,353,721 B2 | 7/2019 | Patel | |
| 2003/0081002 A1 * | 5/2003 | De Vorchik | G06F 8/38 |
| | | | 715/762 |
| 2004/0088394 A1 * | 5/2004 | Brinton | H04L 67/1001 |
| | | | 709/223 |
| 2004/0239982 A1 * | 12/2004 | Gignac | H04N 1/3875 |
| | | | 358/1.18 |
| 2005/0033729 A1 * | 2/2005 | Feinleib | G06F 9/44505 |
| 2007/0122789 A1 | 5/2007 | Yoo | |
| 2013/0297371 A1 * | 11/2013 | Vasko | G06Q 10/0633 |
| | | | 705/7.27 |
| 2015/0120359 A1 * | 4/2015 | Dongieux | G06F 16/285 |
| | | | 705/7.15 |
| 2016/0349932 A1 * | 12/2016 | Gorny | G06F 40/186 |
| 2019/0287197 A1 * | 9/2019 | Chang | G06Q 50/205 |
| 2020/0233662 A1 * | 7/2020 | Bissonette | G06Q 10/063118 |
| 2022/0083330 A1 * | 3/2022 | Monakova | G06F 9/453 |

FOREIGN PATENT DOCUMENTS

| | | | | | |
|---|---|---|---|---|---|
| CA | 2375611 | C | * | 1/2010 | G06F 9/4446 |
| CA | 2530289 | C | * | 3/2010 | G06Q 10/10 |
| CA | 2668306 | A1 | * | 12/2010 | G06F 17/241 |
| CA | 2810041 | A1 | * | 3/2012 | G06F 17/241 |
| CA | 2543501 | C | * | 10/2012 | G06F 8/10 |
| CA | 2538861 | C | * | 11/2012 | G06F 8/30 |
| CA | 2667142 | C | * | 1/2013 | G06F 9/4443 |
| CA | 2864438 | A1 | * | 8/2013 | G06F 8/30 |
| CN | 102324072 | B | * | 2/2015 | |
| JP | 2004013902 | A | * | 1/2004 | A61K 9/2081 |
| JP | 4450515 | B2 | * | 4/2010 | G06F 16/30 |

* cited by examiner

DYNAMICALLY GENERATING GUIDED TOURS FOR SOFTWARE

TECHNICAL FIELD

The present disclosure relates generally to guided tours for software. More specifically, but not by way of limitation, this disclosure relates to dynamically generating guided tours for software.

BACKGROUND

Software has become increasingly complex with more features and options. To make all of these features more accessible to the average user, software developers may provide a tutorial explaining how to use aspects of the software. Such tutorials often take the form of an extensive document (e.g., hundreds of pages) describing all of the functionality for the software. Developers may periodically update the tutorial over time to account for changes to the software or to improve upon the existing explanations in the tutorial.

DETAILED DESCRIPTION

A tutorial is typically a long, complex document that spans dozens or hundreds of pages and describes numerous aspects of a piece of software. The length and complexity of a typical tutorial can make it challenging to understand and follow for an average user. Compounding these problems is the fact that the steps for performing a particular process in a piece of software, such as the steps for opening or saving a file, can change depending on the context in which the piece of software is running and the operating system in which the piece of software is running. As one particular example, a user may wish to open a file using a visual editor. A visual editor is a software component for editing a file, where the software component includes a graphical user interface (GUI) that displays the content (e.g., text) of the file and provides tools for easily manipulating the content. One example of a visual editor can be a what-you-see-is-what-you-get (WYSIWYG) editor. The process for opening a file using the visual editor may change depending on whether the visual editor is running within the context of a website browser or running within the context of a mobile application. And the process for opening a file using the visual editor may change depending on whether the visual editor is running on Microsoft Windows® or Red Hat Enterprise Linux®. To account for these differences, a tutorial for the visual editor may include different sets of instructions describing how to use the visual editor in different contexts and on different operating systems. But this just further increases the length and complexity of the tutorial.

Some examples of the present disclosure can overcome one or more of the abovementioned problems via a guided tour engine that can dynamically generate a tutorial for a software component while the software component is running on a computing device, to guide a user of the computing device as to how to perform a particular process using the software component. Such guidance can be referred to as a tour. The software component can be any software element (e.g., application or service) with which an end user is to interact. The guided tour engine can generate the tutorial at runtime based on various factors, such as the particular process to be performed by the user, a type of the software component, a context in which the software component is running, and the operating system on which the software component is running. The guided tour engine can then present each step in the tutorial to the user in real time, to guide the user through the process. For example, as the user performs each step in the process, the guided tour engine can detect performance of the step and responsively output a next step to the user. The guided tour engine can output the next step in a dialog box or another GUI element within the boundaries of the software component, so that the user does not need to leave the software component to read an external tutorial. This can avoid the slow and tedious process often associated with typical tutorials, in which a user must manually traverse dozens or hundreds of pages of documentation in a text editor that is external to the software component to identify and digest relevant content.

In some examples, the guided tour engine can dynamically generate a tutorial describing how to implement a particular process in a software component by stringing together sub-tutorials that are premade and preregistered with the guided tour engine. Each sub-tutorial can include one or more steps for implementing at least part of a process in the software component. Some sub-tutorials can be specific to a context or an operating system, while other sub-tutorials may be agnostic to the context or the operating system. And some sub-tutorials may depend on other sub-tutorials. These dependencies may be expressed through cross-references inside the sub-tutorials. The guided tour engine can identify relevant sub-tutorials based on these dependencies, the contexts associated with the sub-tutorials, and the operating systems associated with the sub-tutorials. The guided tour engine can then string together (e.g., combine aspects of) the identified sub-tutorials to create a holistic tutorial for the user describing how to implement the process using the software component.

In some examples, the guided tour engine can have an application programming interface (API) through which the guided tour engine can receive inputs from the software component. An input can indicate a user interaction with the software component, a state of the software component, a function performed by the software component, or any combination of these. Based on the inputs, the guided tour engine can monitor the software component to determine whether a current step in a tutorial has been completed. If so, the guided tour engine can output a next step in the tutorial to guide the user through the tutorial in real time.

In some examples, the guided tour engine can output the next step to the user by first generating an indicator of the next step. The indicator can be a graphical element, such as a popup box or arrow. The guided tour engine can then output the indicator at a location that is proximate to the GUI of the software component, such as at a location within the outer visual boundaries of the software component's GUI. In some examples, the indicator can be positioned to overtop of other graphical features of the software component's GUI, so that the user can adequately view the indicator. The guided tour engine can determine where to position the indicator based on various factors, such as coordinates of the software component on the display, coordinates of a graphical feature in the software component's GUI, or both. Positioning the indicator based on such factors may allow the indicator to be placed in more intuitive locations. Positioning the indicator based on such factors may also allow the indicator to be placed in locations that do not visually occlude relevant controls or information in the software component's GUI.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
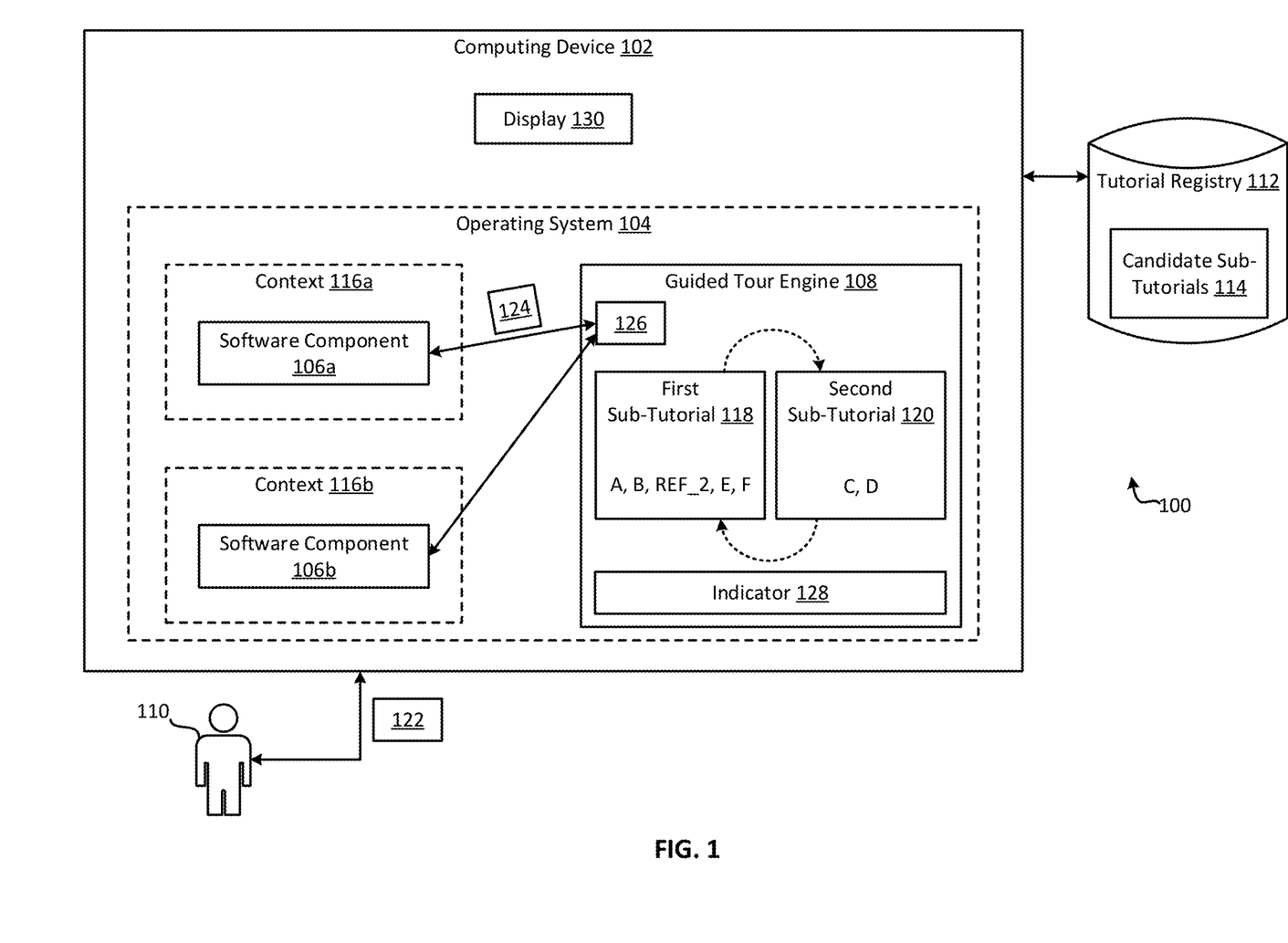
FIG. 1 shows a block diagram of an example of a system for dynamically generating guided tours for software according to some aspects of the present disclosure.

FIG. 1 shows a block diagram of an example of a system 100 for dynamically generating guided tours for software according to some aspects of the present disclosure. The system 100 includes a computing device 102, such as a laptop computer, desktop computer, mobile phone, or tablet. The computing device 102 is running an operating system 104, such as Red Hat Linux®. A software component 106a and a guided tour engine 108 are running on the operating system 104.

The guided tour engine 108 is software for dynamically generating a tutorial to guide a user 110 through performing a process within a graphical user interface (GUI) of the software component 106a. Examples of the process can include creating a graph, table, flowchart, sequence diagram, or node-link diagram. Implementing such a process can involve a sequential series of steps, where each step can involve at least one user interaction with the GUI. Examples of such user interactions can include manipulations of a graphical features like menus, buttons, dials, or controls; dragging-and-dropping of graphical objects; inputting text via a user input device; or any combination of these. In a typical scenario, a user may learn how to perform the process by reading through a lengthy, textual tutorial to identify and digest the relevant information. But in some examples, the guided tour engine 108 can automatically determine and present the relevant information to the user 110.

More specifically, the guided tour engine 108 can dynamically generate the tutorial for the user 110. In some examples, the guided tour engine 108 can generate the tutorial while the software component 106a is running, rather than the tutorial being entirely premade prior to execution of the software component 106a. The guided tour engine 108 can rely on information in a tutorial registry 112 to dynamically generate the tutorial. For example, the guided tour engine 108 can access the tutorial registry 112 over a network, such as a local area network (LAN) or the Internet. Although the tutorial registry 112 is shown as external to the guided tour engine 108 in FIG. 1, in other examples the tutorial registry 112 may be internal to the guided tour engine 108. The tutorial registry 112 can include any number and combination of candidate sub-tutorials 114. The candidate sub-tutorials 114 may have been previously created by developers of software components and registered with the tutorial registry 112 for use by the guided tour engine 108. Each of the candidate sub-tutorials 114 can include one or more steps that can form part of an overall process to be performed by a user. The guided tour engine 108 can dynamically select and combine sub-tutorials from the tutorial registry 112 to arrive at the tutorial for the user 110.

In some examples, the guided tour engine 108 can select sub-tutorials from the tutorial registry 112 based on characteristics associated with the software component 106a. Examples of such characteristics can include a type of the software component 106a, a context 116a in which software component 106a is running, and an operating system 104 on which the software component 106a is running. The guided tour engine 108 can select sub-tutorials from the tutorial registry 112 that have one or more properties matching one or more characteristics associated with the software component 106a. For example, each of the candidate sub-tutorials 114 can have one or more properties indicating a corresponding software component, context, and/or operating system for which the sub-tutorial is applicable. The guided tour engine 108 can determine the characteristics associated with the software component 106a and compare those characteristics to the properties of the candidate sub-tutorials 114, to identify one or more sub-tutorials for use in dynamically populating an overall tutorial for the user 110.

The guided tour engine 108 can also determine one or more sub-tutorials to include in the tutorial based on dependency information. For example, the guided tour engine 108 may select a first sub-tutorial 118 from among the candidate sub-tutorials 114 based on a property of the first sub-tutorial 118 matching a characteristic associated with the software component 106a. The guided tour engine 108 may then analyze the first sub-tutorial 118 to determine if it includes any references to other sub-tutorials. In the example shown in FIG. 1, the first sub-tutorial 118 includes steps A, B, E, and F, as well as a reference ("REF_2") to a second sub-tutorial 120 that includes steps C and D. Based on this reference, the guided tour engine 108 can determine that the first sub-tutorial 118 depends on the second sub-tutorial 120 and responsively include the second sub-tutorial 120 into the overall tutorial for the user 110. The guided tour engine 108 can then analyze the second sub-tutorial 120 to see if it has any references and, if so, incorporate those dependencies into the tutorial. The guided tour engine 108 can iterate this process, recursively analyzing sub-tutorials to identify references to other sub-tutorials and incorporating those other sub-tutorials into the overall tutorial for the user 110.

Having dynamically selected the sub-tutorials 118-120 for inclusion in the tutorial, the guided tour engine 108 can then present the tutorial to the user 110. For example, the guided tour engine 108 can output an indicator 128 of Step A to the user 110. The indicator 128 may be a graphical element displayed on a display 130, such as a touch-screen display or computer monitor. The indicator 128 can include text or images describing Step A. The guided tour engine 108 can then monitor activity occurring in the software component 106a via an application programming interface (API) 126, for example based on messages 124 from the software component 106a to the API 126. By monitoring the activity occurring in the software component 106a, the guided tour engine 108 can determine when the user 110 has completed Step A. In response to detecting that the user 110 has completed Step A, the guided tour engine 108 can determine a next step (Step B) to present to the user 110. The guided tour engine 108 can then output an indicator 128 of Step B to the user 110. The guided tour engine 108 can iterate this process, for example by jumping to the second sub-tutorial 120 for steps C-D and then jumping back to the first sub-tutorial 118 for steps E-F. In this way, the guided tour engine 108 can detect user performance of each step in the tutorial and responsively present a next step to the user 110, in real time while the software component 106a is running, to guide the user 110 through the process described by the tutorial.

As noted above, in some examples the guided tour engine 108 can move from a current step in the tutorial to a next step of the tutorial in response to detecting a user performance of the current step. But in other examples, the guided tour engine 108 can transition from a current step to a next step in response to detecting other types of events. For example, the guided tour engine 108 can automatically transition from a current step to a next step in response to detecting that a predetermined time interval (e.g., 15 seconds) has elapsed. As another example, the guided tour engine 108 can transition from a current step to a next step in response to detecting a user interaction with a "next" button or the like. The guided tour engine 108 may implement a different one of these approaches depending a transition mode assigned to each step. The transition mode for each step may be assigned by the developer of the step or a sub-tutorial containing the step. For example, if the current step is assigned a first transition mode that can be referred to as a "block mode," the guided tour engine 108 may wait for user performance of the current step before transitioning to the next step. And if the current step is assigned a second transition mode that may be referred to as an "auto mode," the guided tour engine 108 may wait for a predetermined time interval to elapse before automatically transitioning from the current step to a next step. And if the current step is assigned a third transition mode that may be referred to as a "demo mode," the guided tour engine 108 may wait for a user interaction with a "next" button or the like before transitioning from the current step to a next step. In this way, each step may be assigned a particular transition mode, such that different steps in a tutorial may have different transition modes. Of course, there may be additional or alternative transition modes that dictate how the guided tour engine 108 traverses through the steps of the tutorial. The above transition modes and events are intended to be illustrative and non-limiting.

In some examples, a tutorial may involve multiple software components 116a-b. For example, the user 110 may wish to implement a particular process in software component 106a. To do so, the guided tour engine 108 may determine a set of sub-tutorials from the tutorial registry 112 for implementing the particular process. At least one of the sub-tutorials may describe a sub-process involving usage of another software component 106b. For example, steps A, B, E, and F of the first sub-tutorial 118 may be configured to be performed in software component 106a, while steps C and D of the second sub-tutorial 120 may be configured to be performed in software component 106b (which may be of a different type, or in a different context 116b, than software component 106a). This may result in the user 110 switching between different software components 106a-b to effectuate the process described in the tutorial. It will be appreciated that a tutorial can include any number and combination of sub-tutorials, which in turn can describe any number and combination of sub-processes involving any number and combination of software components.

A particular example of the abovementioned features will now be described with reference to FIGS. 1-2 together. In this example, the software component 106a is a Decision Model and Notation (DMN) editor, such as Kogito by Red Hat®. The DMN editor can be running in a webpage of a website browser, which can serve as the context 116a. In general, a context is a host application environment in which a software component is running. A context exists above the operating system level and different than an operating system. Other examples of contexts can include a browser extension, a mobile application, a desktop application, an embedded frame in a webpage, and so on. In this example, the website is running on Red Hat Linux®, which can serve as the operating system 104 in FIG. 1.

A user 110 may wish to create a DMN asset or perform another process in the DMN editor. To initiate the process of creating a DMN asset, the user 110 may provide a user input 122 to the DMN editor. The user 110 can provide the user input 122 via a user input device, such as a touch-screen display, a mouse, or a keyboard. In one such example, the user 110 can press a button in the DMN editor to initiate a process for creating a DMN asset. The DMN editor can receive the user input 122 and responsively transmit a message 124 to the API 126 of the guided tour engine 108. The message 124 may indicate that the user is attempting to create a DMN asset. For example, the message 124 may indicate that a button has been pressed for creating a DMN asset. The guided tour engine 108 can receive the message 124 and determine that the user 110 is trying to create a DMN asset based on the message 124. The guided tour engine 108 can then select one or more sub-tutorials associated with creating a DMN asset in a DMN editor. The guided tour engine 108 can select the one or more sub-tutorials based on the context 116a and/or operating system 104 in which the DMN editor is running.

Figure 2:
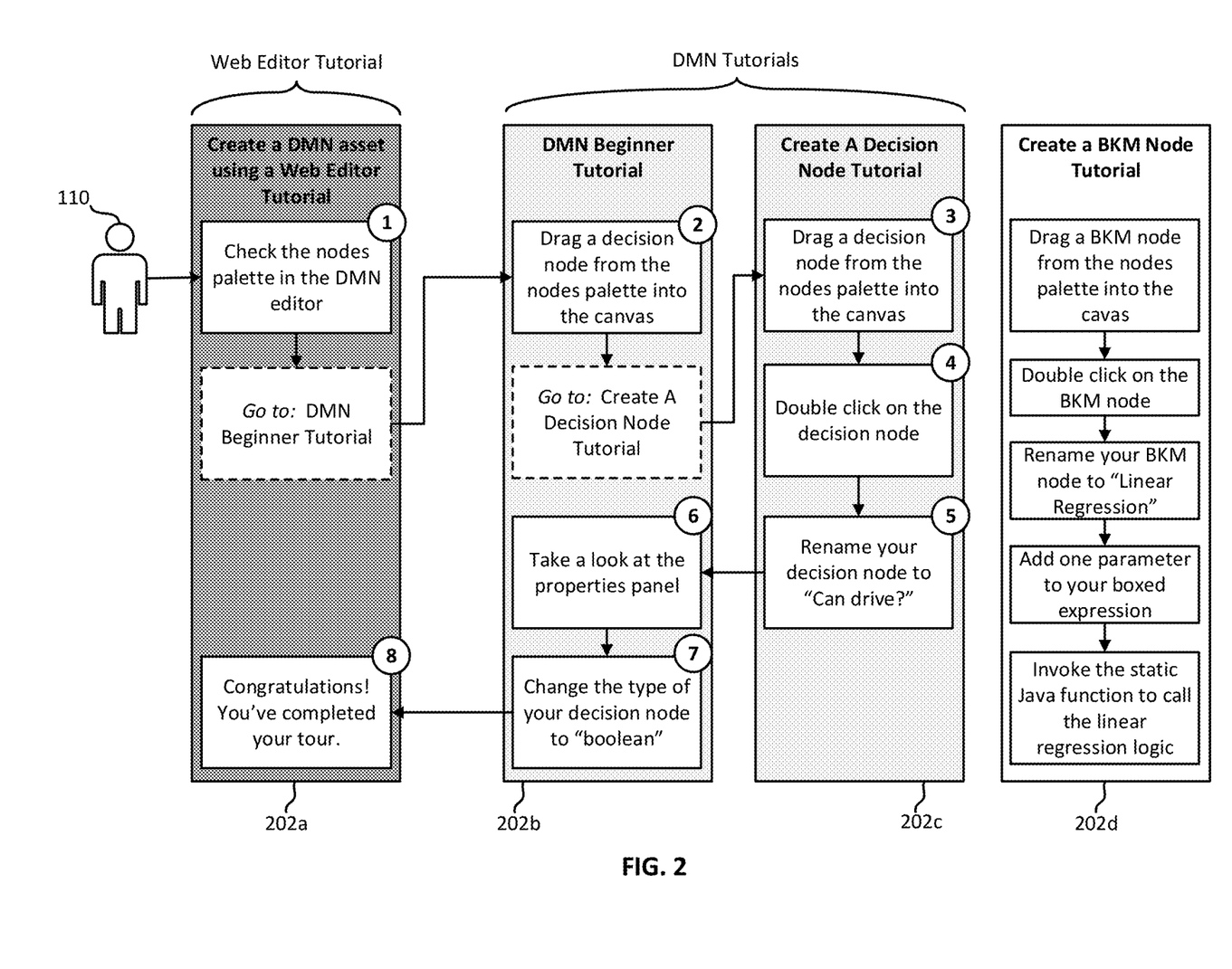
FIG. 2 shows an example of dynamically generating a guided tour according to some aspects of the present disclosure.

In the example shown in FIG. 2, the guided tour engine 108 can first fetch a sub-tutorial 202 for "creating a DMN asset using a web editor," where a web editor is a visual editor embedded in a webpage. The guided tour engine 108 can select the sub-tutorial 202a based on the DMN editor running in the context of a webpage, as described above. The guided tour engine 108 can analyze sub-tutorial 202a to determine that it has a link to (e.g., a reference to or dependency on) sub-tutorial 202b, as shown in FIG. 2 by a dashed box. So, the guided tour engine 108 can include sub-tutorial 202b in the overall tutorial for the user. The guided tour engine 108 can then analyze sub-tutorial 202b to determine that it has a link to sub-tutorial 202c, as shown in FIG. 2 by another dashed box. So, the guided tour engine 108 can include sub-tutorial 202c in the overall tutorial for the user. In this way, the guided tour engine 108 can recursively analyze and fetch the sub-tutorials and their dependencies.

It will be appreciated that the guided tour engine 108 may not incorporate irrelevant sub-tutorials into the tutorial for the user 110. For example, the guided tour engine 108 may skip over (or otherwise exclude) sub-tutorials that are listed in the tutorial registry 112 but that relate to other types of visual editors, such as a Business Process Management and Notation (BPMN) editor, a Business Knowledge Model (BKM) editor, or a Predictive Model Markup Language (PMML) editor. In the example shown in FIG. 2, the guided tour engine 108 may determine that sub-tutorial 202d is not relevant to creating a DMN asset, since creating a BKM node is a more complex topic that is not part of the DMN beginner tutorial. As a result, the guided tour engine 108 may exclude sub-tutorial 202d from the tutorial.

Having dynamically selected the sub-tutorials 202a-c for inclusion in the tutorial, the guided tour engine 108 can then present the tutorial to the user 110. For example, the guided tour engine 108 can first output an indicator 128 of Step (1)

shown in FIG. 2. The guided tour engine 108 can output the indicator 128 on the display 130 of the computing device 102. The indicator 128 can include the text of Step (1). The guided tour engine 108 can then monitor activity occurring in the DMN editor via the API 126, for example based on messages from the DMN editor to the API 126. By monitoring the activity occurring in the DMN editor, the guided tour engine 108 can determine that the user 110 has completed Step (1) of sub-tutorial 202a. Based on the reference in sub-tutorial 202a to the other sub-tutorial 202b, the guided tour engine 108 can then jump to the first step in sub-tutorial 202b and supply that step as Step (2) to the user 110. For example, the guided tour engine 108 can output another indicator 128 that includes the text of Step (2) on the display 130 of the computing device 102. The guided tour engine 108 can then monitor activity occurring in the DMN editor via the API 126 to determine that the user 110 has completed Step (2) of sub-tutorial 202a. So, the guided tour engine 108 can jump to the first step in sub-tutorial 202c and supply that step as Step (3) to the user 110. For example, the guided tour engine 108 can output yet another indicator 128 that includes the text of Step (3) on the display 130 of the computing device 102. The process can similarly continue for Steps (4)-(8), until the tutorial is complete. In this way, the guided tour engine 108 can detect user performance of each step in the tutorial and responsively present a next step to the user, in real time while the DMN editor is running, to guide the user through the process of creating a DMN asset.

While FIGS. 1-2 depict certain components for exemplary purposes, the components shown in FIGS. 1-2 are intended to be illustrative and non-limiting. Other examples may include more components, fewer components, different components, or a different arrangement of the components shown in FIGS. 1-2. For instance, although FIG. 2 depicts a particular set of sub-tutorials 202a-d that each include a particular sequence of steps, other examples may involve other sub-tutorials for implementing other sequences of steps using any number and combination of software components.

Figure 3:
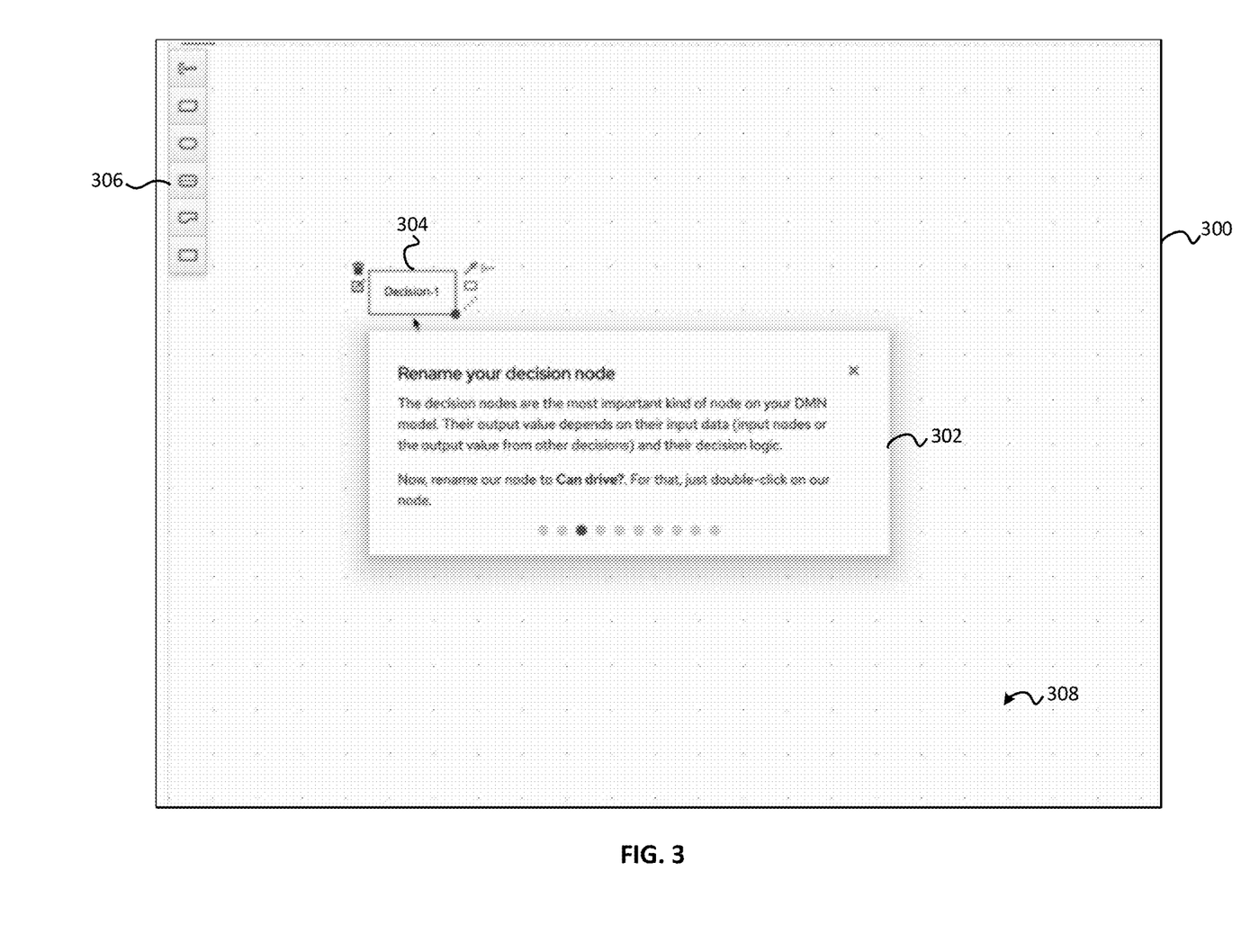
FIG. 3 shows an example of a graphical user interface of a software component including an indicator of a step in a tutorial according to some aspects of the present disclosure.

FIG. 3 shows an example of a graphical user interface 300 of a software component including an indicator 302 of a step in a tutorial according to some aspects of the present disclosure. The graphical user interface 300 may be represented using a document object model (DOM) in some examples. The graphical user interface 300 includes a menu 306 of tools for incorporating graphical objects ("objects"), such as object 304, into a work area 308. While the work area 308 is gridded in this example, in other examples the work area 308 may exclude a grid. A user may be able to draw objects in the work area 308 (e.g., using the tools from the menu 306) or drag-and-drop objects into the work area 308. Once an object is in the work area 308, the user can manipulate the object 308 as desired.

In the example shown in FIG. 3, a user is engaged in a process for creating a DMN asset that is similar to the process shown in FIG. 2. In particular, the user is at a particular step of the process in which the user is to rename the object 304 (also referred to as a "node") to "Can drive?" The guided tour engine has output an indicator 302 of this step in the work area 308, where the indicator 302 is in the form of a dialog box. Although the indicator 302 is shown in the work area 308, in other examples the guided tour engine may position the indicator 302 elsewhere in the graphical user interface 300. If the guided tour engine detects that the user has completed the current step, or detects another event associated with the current step, the guided tour engine may close the indicator 302 and output a new indicator (not shown) describing a next step in the process.

In some examples, the guided tour engine can determine a location in the graphical user interface 300 at which to position the indicator 302 of the next step. The guided tour engine can determine the location based on coordinate information provided by the software component. For example, the software component may supply coordinate information to the API of the guided tour engine. The coordinate information may include coordinates of one or more graphical features of the graphical user interface 300, such as coordinates of the menu 306, the object 304, the work area 308, or any combination of these. In an example in which the work area 308 is gridded, the coordinate information may also include a grid-cell size or other information relating to the grid. The guided tour engine can then determine a location (e.g., coordinates) at which to position the indicator 302 based on such coordinate information, so that the indicator 302 does not visually occlude the menu 306, the object 304, the work area 308, or any combination of these. The guided tour engine can then output the indicator 302 at the determined location in the graphical user interface 300.

In some examples, the guided tour engine can take into account other factors in determining a location at which to position the indicator 302 in the graphical user interface 300. For example, the software component may additionally or alternatively supply dimensional information to the API of the guided tour engine. The dimensional information may include one or more dimensions (e.g., length, width, height, or radius) of one or more graphical features of the graphical user interface 300, such as dimensions of the menu 306, the object 304, the work area 308, or any combination of these. The guided tour engine can determine the location at which to position the indicator 302 based on such dimensional information. This may further help to prevent the indicator 302 from visually occluding relevant features of the graphical user interface 300. As another example, the guided tour engine may additionally or alternatively determine a location at which to position the indicator 302 in the graphical user interface 300 based on a context in which the software component. In particular, it may be desirable for the guided tour engine to position the indicator 302 at different locations depending on whether the software component is running within the context of a webpage, a mobile application, or a desktop application. So, the guided tour engine may alter the location of the indicator 302 based on the context. Any number of factors can be taken into account by the guided tour engine in determining where to position each indicator of each step in the tutorial.

Figure 4:
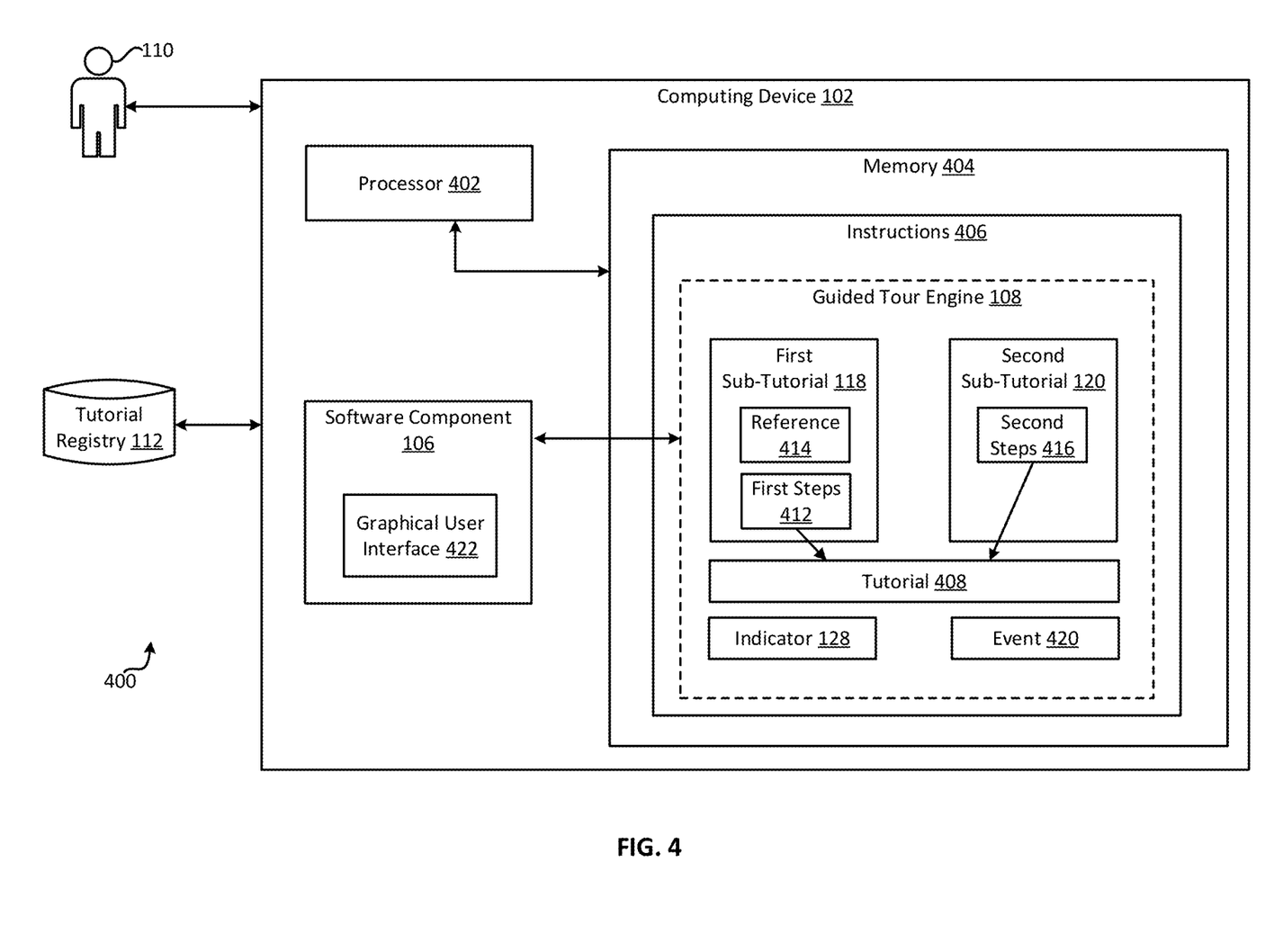
FIG. 4 shows a block diagram of another example of a system for dynamically generating guided tours for software according to some aspects of the present disclosure.

FIG. 4 shows a block diagram of another example of a system 400 for dynamically generating guided tours for software according to some aspects of the present disclosure. The system 400 includes a processor 402 communicatively coupled with a memory 404. The processor 402 and the memory 404 can be parts of the same computing device (e.g., computing device 102 of FIG. 1) or they can be distributed from one another.

The processor 402 can include one processor or multiple processors. Non-limiting examples of the processor 402 include a Field-Programmable Gate Array (FPGA), an application-specific integrated circuit (ASIC), a microprocessor, etc. The processor 402 can execute instructions 406 stored in the memory 404 to perform operations. In some examples, the instructions 406 can include processor-specific instructions generated by a compiler or an interpreter from code written in any suitable computer-programming language, such as C, C++, C#, etc.

The memory 404 can include one memory or multiple memories. The memory 404 can be non-volatile and may include any type of memory that retains stored information when powered off. Non-limiting examples of the memory 404 include electrically erasable and programmable read-only memory (EEPROM), flash memory, or any other type of non-volatile memory. At least some of the memory can include a non-transitory computer-readable medium from which the processor 402 can read instructions 406. The non-transitory computer-readable medium can include electronic, optical, magnetic, or other storage devices capable of providing the processor 402 with computer-readable instructions or other program code. Examples of the non-transitory computer-readable medium include magnetic disk(s), memory chip(s), ROM, random-access memory (RAM), an ASIC, a configured processor, optical storage, or any other medium from which a computer processor can read the instructions 406.

In some examples, the instructions 406 can include program code for a guided tour engine 108 that is executable by the processor 402 for causing the processor 402 to dynamically generate a tutorial 408 for a software component 106, where the tutorial 408 is configured to guide a user 110 as to how to perform a particular process within a graphical user interface 422 of the software component 106. The processor 402 can generate the tutorial 408 while the software component 106 is running on a computing device 102 or prior to the software component 106 running on the computing device 102.

More specifically, the processor 402 can determine a process that is to be performed by a user 110 within a graphical user interface 422 of a software component 106. For example, the user 110 may provide user input indicating the process that the user wishes to perform in the graphical user interface 422. As one particular example, the user 110 may push a button for creating a DMN asset in a DMN editor, thereby indicating to the processor 402 that the process to be performed involves creating a DMN asset.

Next, the processor 402 can select a first sub-tutorial 118 from a tutorial registry 112 based on the process to be performed by the user 110 within the graphical user interface 422. The first sub-tutorial 118 can include a first step 412 (e.g., instruction) for performing a first part of the process and a reference 414 to a second sub-tutorial 120. Based on the reference 414, the processor 402 can also select the second sub-tutorial 120 from the tutorial registry 112. The second sub-tutorial 120 can include a second step 416 for performing a second part of the process. It will be appreciated that the terms "first" and "second" as used herein are intended to distinguish among elements (e.g., sub-tutorials, parts, and steps), and not necessarily to identify specific elements. The processor 402 can generate a tutorial 408 based on the first sub-tutorial 118 and the second sub-tutorial 120. For example, the processor 402 can determine an ordered sequence of steps that includes the first step 412 and the second step 416 and use the ordered sequence of steps as the tutorial 408.

The processor 402 can then guide the user 110 through performing the process within the graphical user interface 422 by detecting an event 420 associated with each step in the tutorial 408 and responsively generating an indicator 128 of a next step of the tutorial 408 for display within the graphical user interface 422. Examples of the event 420 can include user performance of the step, passage of a predetermined time interval, or a user interaction with a "next" button or the like. Examples of the indicator 128 can include a dialog box, arrow, icon, popup box, or any other suitable GUI element. After generating the indicator 128, the processor 402 may output the indicator 128 of the next step at any suitable location inside the graphical user interface 422 of the software component 106, such as proximate to (e.g., adjacent to) a graphical feature of the GUI involved in the next step.

Figure 5:
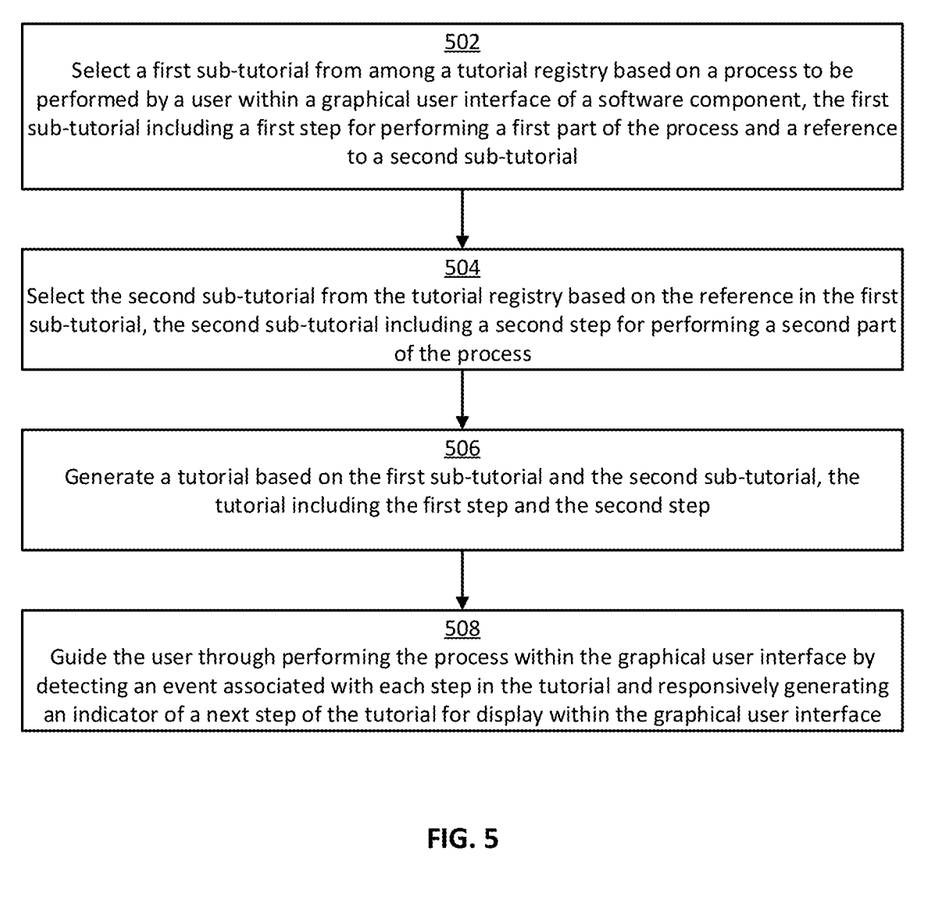
FIG. 5 is a flow chart of an example of a process for dynamically generating guided tours for software according to some aspects of the present disclosure.

In some examples, the processor 402 can implement some or all of the steps shown in FIG. 5. Other examples can include more steps, fewer steps, different steps, or a different order of the steps than is shown in FIG. 5. The steps of FIG. 5 are discussed below with reference to the components discussed above in relation to FIG. 4.

In block 502, the processor 402 selects a first sub-tutorial 118 from a tutorial registry 112 based on a process to be performed by a user 110 within a graphical user interface 422 of a software component 106. The first sub-tutorial 118 can include a first step 412 for performing a first part of the process and a reference 414 to a second sub-tutorial 120.

In some examples, the processor 402 can select the first sub-tutorial 118 based on additional or alternative factors, such as a type of the software component 106, a context in which the software component 106 is running on the computing device 102, an operating system on which the software component 106 is running on the computing device 102, or any combination of these. For example, the processor 402 may determine that the software component 106 is a BPMN editor (e.g., rather than a DMN editor, a PMML editor, a DMN test tool, or another type of software). So, the processor 402 can select the first sub-tutorial 118 from the tutorial registry 112 based on the first sub-tutorial 118 being usable with a BPMN editor.

In block 504, the processor 402 selects a second sub-tutorial 120 from the tutorial registry 112 based on the reference 414 in the first sub-tutorial 118. In some examples, the processor 402 can select the second sub-tutorial 120 based on additional or alternative factors, such as the type of the software component 106, the context in which the software component 106 is running on the computing device 102, the operating system on which the software component 106 is running on the computing device 102, or any combination of these. The second sub-tutorial 120 can include a second step 416 for performing a second part of the process.

In block 508, the processor 402 generates a tutorial 408 based on the first sub-tutorial 118 and the second sub-tutorial 120. The tutorial 408 can include the first step 412 and the second step 416. For example, the processor 402 can determine an ordered sequence of steps based on the first step 412 and the second step 416 and use the ordered sequence of steps as the tutorial 408.

In block 508, the processor 402 guides the user 110 through performing the process within the graphical user interface 422 by detecting an event 420 associated with each step in the tutorial 408 and responsively generating an indicator 128 of a next step of the tutorial 408 for display within the graphical user interface 422.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processing device; and
a memory device including instructions for a guided tour engine, the guided tour engine being separate from a host application that includes a software component, the guided tour engine being executable by the processing device for causing the processing device to perform the following operations while the host application and the software component are running on a computing device:
   determine a process to be performed by a user within a graphical user interface of the software component;
   determine that the software component is running on the computing device within a particular type of host application or on a particular type of operating system;
   select a first sub-tutorial from a tutorial registry based on the process to be performed by the user, the selection of the first sub-tutorial being further based on the particular type of host application or the particular type of operating system in which the software component is running, the tutorial registry being separate from the host application and accessible to the guided tour engine, the tutorial registry including a plurality of sub-tutorials describing how to use the software component to perform the process in different host applications and/or operating systems, the first sub-tutorial including a first step describing how to perform a first part of the process using one or more software features of the software component, and the first sub-tutorial including a reference to a second sub-tutorial;
   select the second sub-tutorial from the tutorial registry based on the reference in the first sub-tutorial, the second sub-tutorial including a second step for performing a second part of the process;
   generate a tutorial based on the first sub-tutorial and the second sub-tutorial, the tutorial including the first step and the second step, wherein the tutorial is distinct from the software component and describes how to perform the process using at least the one or more software features of the software component; and
   guide the user through performing the process within the graphical user interface by detecting an event associated with each step in the tutorial and responsively generating an indicator of a next step in the tutorial for display within the graphical user interface.

2. The system of claim 1 wherein the particular type of host application is a website browser, a mobile application, or a desktop application.

3. The system of claim 1, wherein the memory device further includes instructions that are executable by the processing device for causing the processing device to:
   determine, based on coordinate information provided by the software component to the guided tour engine, a location in the graphical user interface at which to position the indicator of the next step; and
   output the indicator at the location in the graphical user interface.

4. The system of claim 1, wherein the first sub-tutorial and the second sub-tutorial are separate from one another and preregistered with the tutorial registry prior to the software component being run on the computing device.

5. The system of claim 1, wherein the software component is a first software component, the host application is a first host application, the first step is configured to be performed using the first software component, and the second step is configured to be performed using a second software component that is different from the first software component, the second software component being included in a second host application that is different from the first host application.

6. The system of claim 1, wherein the guided tour engine and the software component are both located on the computing device.

7. The system of claim 1, wherein the software component is a visual editor.

8. A method comprising:
   determining, by a guided tour engine executing on a processor, a process to be performed by a user within a graphical user interface of a software component, the guided tour engine being separate from a host application that includes the software component, wherein the host application and the software component are running on a computing device;
   determining, by the guided tour engine, that the software component is running on the computing device within a particular type of host application or on a particular type of operating system;
   selecting, by the guided tour engine, a first sub-tutorial from a tutorial registry based on the process to be performed by the user, the selection of the first sub-tutorial being further based on the particular type of host application or the particular type of operating system in which the software component is running, the tutorial registry being separate from the host application and accessible to the guided tour engine, the tutorial registry including a plurality of sub-tutorials describing how to use the software component to perform the process in different host applications and/or operating systems, the first sub-tutorial including a first step describing how to perform a first part of the process using one or more software features of the software component, and the first sub-tutorial including a reference to a second sub-tutorial;
   selecting, by the guided tour engine, the second sub-tutorial from the tutorial registry based on the reference in the first sub-tutorial, the second sub-tutorial including a second step for performing a second part of the process;
   generating, by the guided tour engine, a tutorial based on the first sub-tutorial and the second sub-tutorial, the tutorial including the first step and the second step, wherein the tutorial is distinct from the software component and describes how to perform the process using at least the one or more software features of the software component; and
   guiding, by the guided tour engine, the user through performing the process within the graphical user interface by detecting an event associated with each step in the tutorial and responsively generating an indicator of a next step of the tutorial for display within the graphical user interface.

9. The method of claim 8, further comprising:
   determining that the software component is running within the particular type of host application on the computing device; and
   selecting the first sub-tutorial from the tutorial registry based on the particular type of host application.

10. The method of claim 8, further comprising:
   determining that the software component is running within the particular type of operating system on the computing device; and
   selecting the first sub-tutorial from the tutorial registry based on the particular type of operating system.

11. The method of claim 8, further comprising:
   determining, based on coordinate information received from the software component by the guided tour engine, a location in the graphical user interface at which to position the indicator of the next step; and
   displaying the indicator at the location in the graphical user interface.

12. The method of claim 8, wherein the software component is a first software component, the host application is a first host application, the first step is configured to be performed using the first software component, and the second step is configured to be performed using a second software component that is different from the first software component, the second software component being included in a second host application that is different from the first host application.

13. A non-transitory computer-readable medium comprising program code for a guided tour engine, the guided tour engine being separate from a host application that includes a software component, the guided tour engine being executable by a processing device for causing the processing device to perform the following operations while the host application and the software component are running on a computing device:
   determine a process to be performed by a user within a graphical user interface of the software component;
   determine that the software component is running on the computing device within a particular type of host application or on a particular type of operating system;
   select a first sub-tutorial from a tutorial registry based on the process to be performed by the user, the selection of the first sub-tutorial being further based on the particular type of host application or the particular type of operating system in which the software component is running, the tutorial registry being separate from the host application and accessible to the guided tour engine, the tutorial registry including a plurality of sub-tutorials describing how to use the software component to perform the process in different host applications and/or operating systems, the first sub-tutorial including a first step describing how to perform a first part of the process using one or more software features of the software component, and the first sub-tutorial including a reference to a second sub-tutorial;
   select the second sub-tutorial from the tutorial registry based on the reference in the first sub-tutorial, the second sub-tutorial including a second step for performing a second part of the process;
   generate a tutorial based on the first sub-tutorial and the second sub-tutorial, the tutorial including the first step and the second step, wherein the tutorial describes how to perform the process using at least the one or more software features of the software component; and
   guide the user through performing the process within the graphical user interface by detecting an event associated with each step in the tutorial and responsively generating an indicator of a next step in the tutorial for display within the graphical user interface.

14. The non-transitory computer-readable medium of claim 13, further comprising program code that is executable by the processing device for causing the processing device to:
   determine that the software component is running within the particular type of host application on the computing device; and
   select the first sub-tutorial from the tutorial registry based on the particular type of host application.

15. The non-transitory computer-readable medium of claim 13, further comprising program code that is executable by the processing device for causing the processing device to:
   determine that the software component is running within the particular type of operating system on the computing device; and
   select the first sub-tutorial from the tutorial registry based on the particular type of operating system.

16. The non-transitory computer-readable medium of claim 13, further comprising program code that is executable by the processing device for causing the processing device to:
   determine, based on coordinate information received by the guided tour engine from the software component, a location in the graphical user interface at which to position the indicator of the next step; and
   output the indicator at the location in the graphical user interface.

17. The system of claim 1, wherein the guided tour engine is further executable by the processing device to receive input from the software component via an application programming interface.

18. The system of claim 17, wherein the guided tour engine is further executable by the processing device to determine whether a current step in the tutorial is complete based on the input from the software component.

19. The system of claim 1, wherein the event is a passage of a predetermined time interval.

20. The system of claim 1, wherein the tutorial registry is separate from the guided tour engine and accessible to the guided tour engine via a computer network.

* * * * *